US012772286B2

(12) United States Patent
Cimpu et al.

(10) Patent No.: US 12,772,286 B2
(45) Date of Patent: Oct. 20, 2026

(54) METHOD FOR IMPROVING PN-NPN COEXISTENCE

(71) Applicant: Telefonaktiebolaget LM Ericsson (publ), Stockholm (SE)

(72) Inventors: Virgil Cimpu, Ottawa (CA); Mats Buchmayer, Enskede Gard (SE); Gunther Auer, Gothenburg (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 553 days.

(21) Appl. No.: 17/787,748

(22) PCT Filed: Nov. 18, 2020

(86) PCT No.: PCT/EP2020/082584
§ 371 (c)(1),
(2) Date: Jun. 21, 2022

(87) PCT Pub. No.: WO2021/136618
PCT Pub. Date: Jul. 8, 2021

(65) Prior Publication Data

US 2023/0269771 A1 Aug. 24, 2023

Related U.S. Application Data

(60) Provisional application No. 62/955,695, filed on Dec. 31, 2019.

(51) Int. Cl.
*H04W 74/0816* (2024.01)
*H04W 74/08* (2024.01)

(52) U.S. Cl.
CPC ... *H04W 74/0816* (2013.01); *H04W 74/0866* (2013.01)

(58) Field of Classification Search
CPC ...................... H04W 74/0816; H04W 74/0866
See application file for complete search history.

(56) References Cited

U.S. PATENT DOCUMENTS

2011/0003611 A1* 1/2011 Haas ..................... H04W 52/10 455/512
2014/0029524 A1* 1/2014 Dimou .................. H04W 16/10 370/328

(Continued)

FOREIGN PATENT DOCUMENTS

EP 3567889 A1 11/2019

OTHER PUBLICATIONS

International Search Report and Written Opinion dated Feb. 24, 2021 for International Application No. PCT/EP2020/082584 filed Nov. 18, 2020, consisting of 13 pages.

(Continued)

*Primary Examiner* — Dave Czekaj
(74) *Attorney, Agent, or Firm* — Weisberg I.P. Law, P.A.

(57) ABSTRACT

A method, system and apparatus for coexistence of a public network and a non-public network are disclosed. According to one aspect, a method includes selectively muting a downlink transmission to a public network (PN) based at least in part on whether the downlink transmission interferes with a non-public network (NPN) uplink transmission. According to another aspect, a method includes selectively muting an uplink transmission from the NPN based at least in part on whether the uplink transmission interferes with a public network (PN) downlink transmission.

18 Claims, 20 Drawing Sheets

(56) References Cited

U.S. PATENT DOCUMENTS

| | | | | |
|---|---|---|---|---|
| 2016/0182212 | A1* | 6/2016 | Zarifi | H04W 28/0236 370/336 |
| 2016/0242038 | A1* | 8/2016 | Lei | H04W 72/0446 |
| 2017/0273065 | A1 | 9/2017 | Stirling-Gallacher et al. | |
| 2020/0221372 | A1* | 7/2020 | Shih | H04W 76/25 |
| 2021/0392511 | A1* | 12/2021 | Balachandran | H04W 16/18 |

OTHER PUBLICATIONS

ETSI TS 136 211 V15.7.0 (Oct. 2019); LTE; Evolved Universal Terrestrial Radio Access (E-UTRA); Physical channels and modulation (3GPP TS 36.211 version 15.7.0 Release 15), consisting of 241.

* cited by examiner

METHOD FOR IMPROVING PN-NPN COEXISTENCE

CROSS-REFERENCE TO RELATED APPLICATIONS

This application is a Submission Under 35 U.S.C. § 371 for U.S. National Stage Patent Application of International Application No.: PCT/EP2020/082584, filed Nov. 18, 2020 entitled "METHOD FOR IMPROVING PN-NPN COEXISTENCE," which claims priority to U.S. Provisional Application No. 62/955,695, filed Dec. 31, 2019, entitled "METHOD FOR IMPROVING PN-NPN COEXISTENCE," the entireties of both of which are incorporated herein by reference.

TECHNICAL FIELD

The present disclosure relates to wireless communications, and in particular, to coexistence of a public network and a non-public network.

BACKGROUND

The wireless communication industry and the manufacturing industries are currently seeking solutions to the problem of how to evolve industrial networks and utilize Third Generation Partnership Project (3GPP) Fourth Generation (4G) and Fifth Generation (5G) technologies in the next industrial evolution. A group within the 3GPP is currently working on the specification of 5G (5G is also referred to as "New Radio" (NR)). In an effort to adapt 5G to industrial applications, 3GPP is identifying use cases as well as a number of different work items to support what is called non-public networks (NPN).

An NPN is typically a network that provides 5G network services exclusively to a clearly defined organization or group of organizations, which defines a closed set of users/devices in a factory or other industrial deployment. There are two alternative versions of NPN that are currently specified: Public Network-Integrated NPN (PNI-NPN) and Stand Alone NPN (SNPN).

In the PNI-NPN solution, an operator may use its own Public Land Mobile Network Identity (PLMN-ID) to also integrate an NPN, setting up something similar to the Closed Subscriber Group concept in evolved universal terrestrial radio access network (E-UTRAN) to limit access to the NPN.

In the SNPN solution, a non-public network is able to use a PLMN ID that is shared among several deployments as well as a unique PLMN ID. The PLMN ID is coupled with a Network Identity (NID), which may be locally assigned or globally unique.

Common to any NPN solutions, it may be assumed that the non-public network will be deployed on a separate frequency from a public macro network, providing nationwide mobile broadband (MBB) services. A reason for this assumption is that for a deployed co-channel, the closed set of subscribers of an NPN network may cause interference to other wireless devices in public macro networks. Likewise, NPN may be susceptible to interference from public macro networks. On the other hand, on separate, or adjacent frequency channels, the interference may be more manageable. However, even if NPN and public macro networks are deployed in different frequency bands, there may still be mutual residual interference, due to out-of-band radiation caused by imperfect filters. Regulatory bodies set maximum levels of out-of-band radiation between different bands that must not be exceeded.

Another NPN problem is related to the different deployment goals between the Macro Public networks and the NPNs. For example, an NPN serving an industrial complex or a factory might have strict latency requirements specific to ultra-reliable low latency communication (URLLC), which in turn may require a different time division duplex (TDD) configuration vs a macro MBB deployment. In the TDD mode, one spectrum allocation, e.g., 100 MHz, will be shared for both the uplink and downlink directions and the uplink (UL) is separated from the downlink (DL) by the allocation of different time slots in the same frequency band, as opposed to frequency division duplex (FDD) where uplink and downlink are separated in the frequency domain. For example, in Long Term Evolution (LTE), the standards define a number of different UL and DL allocation schemes. The 3GPP supported, uplink-downlink configurations for LTE are defined in 3GPP standards such as in Table 4.2-2 of 3GPP Technical Specification (TS) 36.211, reproduced below as Table 1. In Table 1, U and D refer to uplink and downlink, respectively, while S refers to a special subframe, which includes uplink and downlink slots as well as a guard time that allows for switching between downlink and uplink.

TABLE 1

| Uplink-downlink | Downlink-to-Uplink | Subframe number | | | | | | | | | |
|---|---|---|---|---|---|---|---|---|---|---|---|
| configuration | Switch-point periodicity | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

For 5G, similar downlink and uplink transmission configurations are possible. Some 5G (New Radio) (NR) TDD configurations used in NR-only bands are listed as examples below (D=Downlink slot; U=Uplink slot; S=Special slot containing both downlink and uplink symbols and a gap between them), including:

DDSU;

DDDSU; and

DDDSUDDSUU.

For industrial URLLC, where latency requirements are important, the following NR TDD pattern may be used:

DSDS, where the S slot contains a majority of uplink symbols, and hence the pattern is also referred to as DUDU.

For the bands where 4G LTE and 5G NR need to coexist, the NR TDD pattern can be configured to match the LTE TDD pattern to avoid uplink-downlink symbol conflicts. Assuming LTE is using a sub-carrier spacing (SCS) of 15 kHz and NR is using a SCS of 30 kHz, some examples of popular NR TDD patterns include:

DD DS UU DD DD, to match the LTE-TDD Config 2;

DD DS UU UU DD, to match the LTE-TDD Config 1; and

DD DS UU UU UU, to match the LTE-TDD Config 0.

In a traditional Mobile Broadband (MBB) scenario, the traffic profile is dominated by downlink traffic and hence in such a scenario the network may be configured to transmit more downlink (sub)frames/slots than uplink (sub)frames/slots, e.g., for LTE/4G configuration 2 in Table 1 would be suitable with 6 downlink subframes and 2 uplink subframes (3:1 ratio).

In an industrial deployment, the traffic profile is, however, expected to be more balanced between uplink and downlink. Then a more balanced uplink-downlink ratio would be more suitable. LTE/4G configuration 1 in Table 1 gives 4 uplink frames and 4 downlink frames (1:1 ratio). In addition to the traffic profile, latency requirements may put additional constraints on the chosen configuration, since shortening uplink/downlink slots reduces the round-trip time, and is, therefore, an aspect to improving latency. Hence, in industrial deployments, there is a need to re-configure the TDD configuration.

In scenarios where a local industrial deployment needs to choose a TDD configuration that differs from the MBB configuration in public networks (PN), co-existence issues between the two networks may arise.

If NPN and PN are synchronized and using the same TDD configuration (i.e., the same UL and DL pattern), there are 2 interference scenarios that may occur: DL to DL and UL to UL as depicted in FIG. 1.

However, given the different requirements between PN and NPN, the NPN operator may choose a different TDD configuration to meet requirements specific to, for example, ultra reliable, low latency communications (URLLC), or to adapt to a more uplink heavy traffic demand. In this case, two new interference scenarios are created for the slots and symbols, where one network is in UL mode and the other network is in DL mode.

Due to the new interference scenarios, the wireless devices of the victim network will potentially experience higher interference levels and, as consequence, lower performance levels. These interference levels may exceed the maximum limit of adjacent channel interference (ACI) allowed by regulatory bodies.

SUMMARY

Some embodiments advantageously provide methods and network nodes for coexistence of a public network and a non-public network.

In some embodiments, to mitigate adjacent channel interference between two network deployments that are using different TDD configurations (i.e., different UL/DL patterns) one network is configured to mute the slots that are in conflict with slots used by the other network, which may allow the other network to use these slots without DL-UL or UL-DL interference. Assuming the NPN network has more stringent latency requirements than the PN network, in some embodiments, the PN network may mute the DL slots that are conflicting with the NPN UL slots, hence allowing for good UL performance for NPN networks, i.e., UL performance meeting predefined performance threshold.

In another embodiment, where the DL traffic demand of the PN network is high and the NPN does not have very stringent latency requirements, the UL slot of the NPN network that conflicts with the DL slot of the PN network may be muted.

In order to mitigate the disadvantages of blocking transmission opportunities through muting, some embodiments might include one or more of the following steps:

Only mute PN downlink resources on network nodes and/or cells that may potentially interfere with the NPN network;

If the network node of the PN network employs an active antenna system (AAS), muting the DL slot may be restricted only to beams that potentially interfere with the NPN network;

Place small cells of the PN network in close physical vicinity to the NPN network. These small cells may be placed such they have a coverage area that is similar to the coverage area of the NPN network. These small cells are configured to serve the PN WDs that are potential victims to the uplink transmissions of the NPN WDs. By muting the downlink slot of the PN small cells, it may be guaranteed that interference scenarios 3 and 4 in FIG. 2 are avoided. At the same time, restrictions due to blocked transmission opportunities by muting are substantially reduced to WDs within the coverage area of the NPN; and Alternatively, at selected locations near the border of the NPN network, some small cells of the NPN network may be deployed. Muting the uplink slots that may collide with downlink slots of the PN mitigates UL to DL interference from NPN to PN, as well as DL to UL interference from PN to NPN.

One advantage is that a Macro Public Network operating in proximity to a Non-Public Network may be able to operate without injecting DL to UL interference into the Non-Public Network. Likewise, the Non-Public Network may operate without inducing UL to DL interference in a Macro Public Network, allowing for a mutually beneficial co-existence scenario.

Strategically placing small cells of the PN within the coverage area of the NPN, as well as placing NPN small cells near the NPN borders, at least partly mitigates the drawback of missed transmission opportunities due to muting. In some embodiments, placement of a PN small cell within a coverage area in combination with muting of selected slots of these small cells provide one way to mitigate impact on a wide area PN deployment while still mitigating interference in local network deployments.

According to one aspect, a network node for use in a public network, PN, configured to be operable in a presence of a non-public network, NPN, is provided. The network node includes processing circuitry configured to perform at least one of the following: selectively muting downlink transmissions to the PN when the downlink transmissions would interfere with an uplink transmission of the NPN if the downlink transmissions were not muted; and selectively muting uplink transmissions of the NPN when the uplink transmissions would interfere with a downlink transmission of the PN.

According to this aspect, in some embodiments, selective muting is during time slots when the downlink transmission would interfere with an uplink transmission. In some embodiments, the downlink muting is restricted to beams of the downlink transmissions that would interfere with the uplink transmission of the NPN. In some embodiments, the downlink muting is restricted to downlink transmissions to wireless devices, WDs, in communication with the PN that are within a coverage area of the NPN. In some embodiments, the network node is positioned within the coverage area of the NPN. In some embodiments, the processing circuitry is further configured to determine coverage areas of the network node that overlap a coverage area of the NPN and to restrict the muting to the overlapping coverage areas. In some embodiments, determining coverage areas of the network node that overlap a coverage area of the NPN is based at least in part on reporting by wireless devices, WDs, within the coverage area of the NPN. In some embodiments, the selective muting is based at least in part on detected interference between the PN and the NPN. In some embodiments, the selective muting is based at least in part on whether the PN uses a time division duplex, TDD, configuration that is different than a TDD configuration of the NPN.

According to another aspect, a method in a network node for use in a public network, PN, configured to be operable in a presence of a non-public network, NPN, is provided. The method includes performing at least one of the following: selectively muting downlink transmissions to the PN when the downlink transmissions would interfere with an uplink transmission of the NPN if the downlink transmissions were not muted; and selectively muting uplink transmissions of the NPN when the uplink transmissions would interfere with a downlink transmission of the PN.

According to this aspect, in some embodiments, selective muting is during time slots when the downlink transmission would interfere with an uplink transmission. In some embodiments, downlink muting is restricted to beams of the downlink transmissions that would interfere with the uplink transmission of the NPN. In some embodiments, the downlink muting is restricted to downlink transmissions to wireless devices, WDs, in communication with the PN that are within a coverage area of the NPN. In some embodiments, the method further includes determining coverage areas of the network node that overlap a coverage area of the NPN and restricting the muting to the overlapping coverage areas. In some embodiments, determining coverage areas of the network node that overlap a coverage area of the NPN is based at least in part on reporting by wireless devices, WDs, within the coverage area of the NPN. In some embodiments, the selective muting is based at least in part on detected interference between the PN and the NPN. In some embodiments, the selective muting is based at least in part on whether the PN uses a time division duplex, TDD, configuration that is different than a TDD configuration of the NPN.

According to yet another aspect, a network node for use in a non-public network, NPN, configured to be operable in a presence of a public network, PN, is provided. The network node includes processing circuitry configured to selectively mute uplink transmissions to the network node when the uplink transmissions would interfere with a downlink transmission of the PN if the uplink transmissions were not muted.

According to this aspect, in some embodiments, the selective muting is during time slots when the uplink transmission would interfere with a downlink transmission. In some embodiments, the processing circuitry is further configured to mute downlink transmissions while the PN is muting uplink transmissions. In some embodiments, the network node is placed at a border of the NPN.

According to another aspect, a method in a network node for use in a non-public network, NPN, configured to be operable in a presence of a public network, PN, is provided. The method includes selectively muting uplink transmissions to the NPN when the uplink transmissions would interfere with a downlink transmission of the PN if the uplink transmissions were not muted.

According to this aspect, in some embodiments, the method further includes muting downlink transmissions while the PN is muting uplink transmissions. In some embodiments, the network node is placed at a border of the NPN.

According to yet another aspect, a method for mitigating interference between a public network (PN) and a non-public network (NPN), is provided. The method includes deploying PN small cells in close proximity to the NPN, the PN small cells deployed to substantially match a coverage area of at least one NPN cell. The method includes deploying the at least one NPN cell at a border of the NPN, and selectively muting transmissions in at least one of the PN small cells.

According to this aspect, in some embodiments, the muting is of downlink transmissions when the NPN has stricter latency requirements than the PN. In some embodiments, the method also includes selectively muting uplink transmissions when downlink traffic of the PN is greater than the downlink traffic of the NPN.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
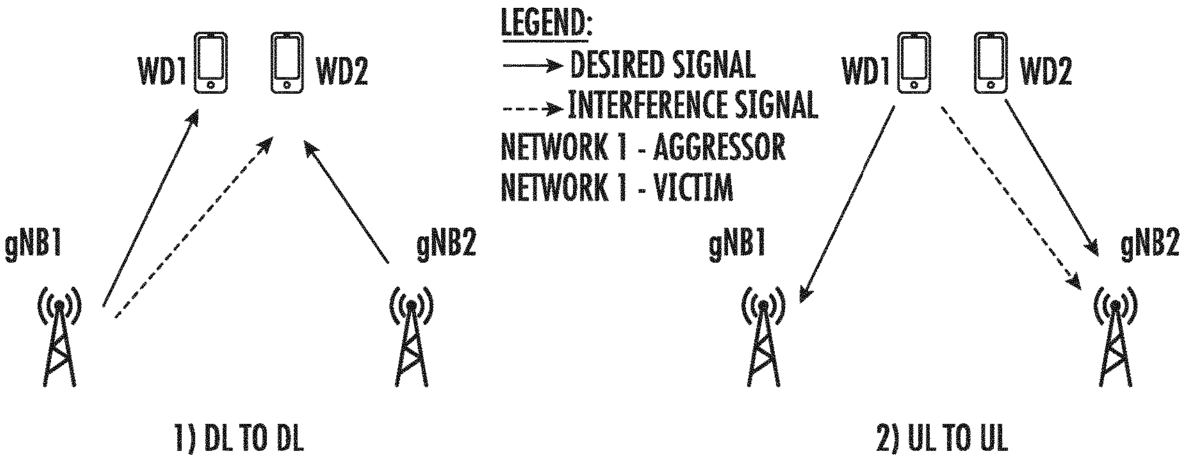
FIG. 1 illustrates two different interference scenarios.

Before describing in detail exemplary embodiments, it is noted that the embodiments reside primarily in combinations of apparatus components and processing steps related to coexistence of a public network and a non-public network. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate, and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

The term "muting" may refer to not scheduling transmission in one or more specific slots such that muting is an action and/or determination that may be performed to not schedule one or more transmissions in the one or more slots.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide for coexistence of a public network and a non-public network. According to one aspect, a method includes selectively muting a downlink transmission to a non-public network (NPN) based at least in part on whether the downlink transmission interferes with an NPN uplink transmission; and/or selectively muting an uplink transmission from the NPN based at least in part on whether the uplink transmission interferes with a public network (PN) downlink transmission.

Figure 3:
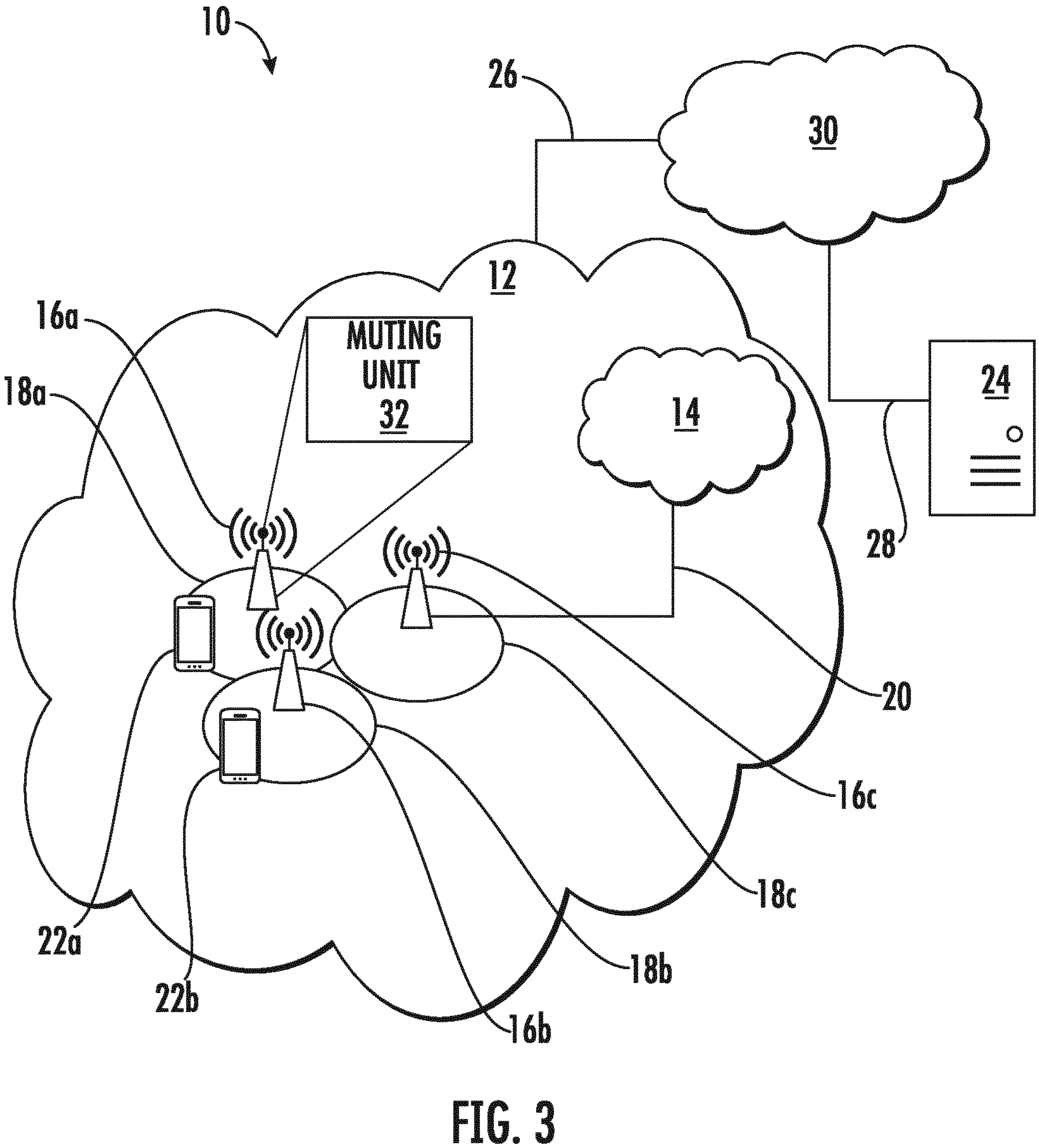
FIG. 3 is a schematic diagram of an exemplary network architecture illustrating a communication system connected via an intermediate network to a host computer according to the principles in the present disclosure.

Returning now to the drawing figures, in which like elements are referred to by like reference numerals, there is shown in FIG. 3 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16*a*, 16*b*, 16*c* (referred to collectively as network nodes 16), such as NBs, eNBs, gNBs or other types of wireless access points, each defining a corresponding coverage area 18*a*, 18*b*, 18*c* (referred to collectively as coverage areas 18). Each network node 16*a*, 16*b*, 16*c* is connectable to the core network 14 over a wired or wireless connection 20. A first wireless device (WD) 22*a* located in coverage area 18*a* is configured to wirelessly connect to, or be paged by, the corresponding network node 16*a*. A second WD 22*b* in coverage area 18*b* is wirelessly connectable to the corresponding network node 16*b*. While a plurality of WDs 22*a*, 22*b* (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16. Note that in some embodiments, one or more network nodes may be employed to form a PN and/or an NPN.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 3 as a whole enables connectivity between one of the connected WDs 22*a*, 22*b* and the host computer 24. The connectivity may be described as an over-the-top (OTT) connection. The host computer 24 and the connected WDs 22*a*, 22*b* are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22*a*. Similarly, the network node 16 need not be aware of the future routing of an outgoing uplink communication originating from the WD 22*a* towards the host computer 24.

A network node 16 is configured to include a muting unit 32 which is configured to selectively mute a downlink transmission to the PN based at least in part on whether the downlink transmission interferes with an NPN uplink transmission, and/or selectively mute an uplink transmission from the NPN based at least in part on whether the uplink transmission interferes with a PN downlink transmission. Note that the muting unit 32 may be implemented in or as a scheduler. Such scheduler may be located in another network node having network management functions or may be located in the cloud. For example, the scheduler may be configured to implement a muting function to avoid scheduling traffic in slots of the downlink and/or uplink.

Example implementations, in accordance with an embodiment, of the WD 22, network node 16 and host computer 24 discussed in the preceding paragraphs will now be described with reference to FIG. 4. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include muting unit 32 which is configured to selectively mute a downlink transmission to the NPN based at least in part on whether the downlink transmission interferes with an NPN uplink transmission, and/or selectively mute an uplink transmission from the NPN based at least in part on whether the uplink transmission interferes with a PN downlink transmission.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22.

Figure 2:
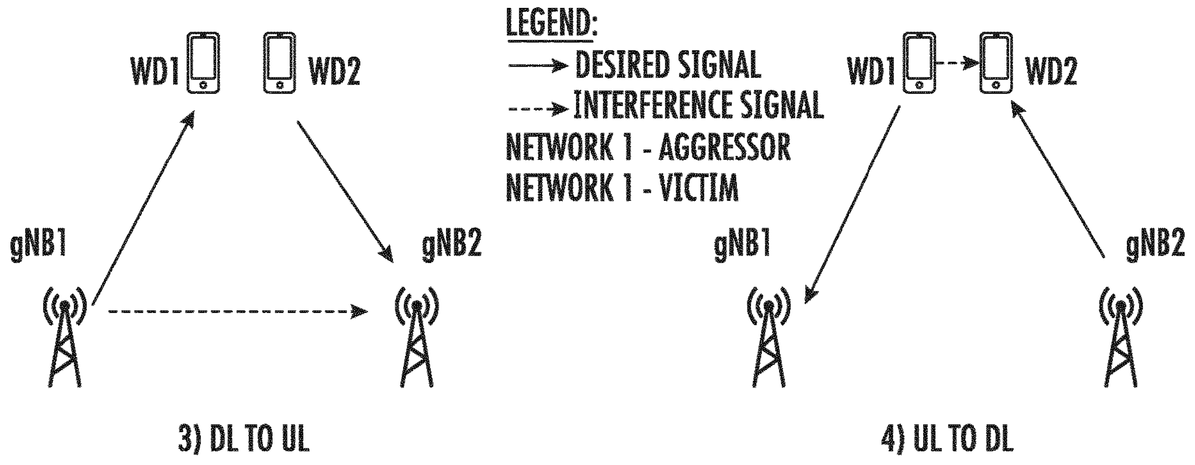
FIG. 2 illustrates two other different interference scenarios.

In some embodiments, the inner workings of the network node 16, WD 22, and host computer 24 may be as shown in FIG. 2 and independently, the surrounding network topology may be that of FIG. 3.

Figure 4:
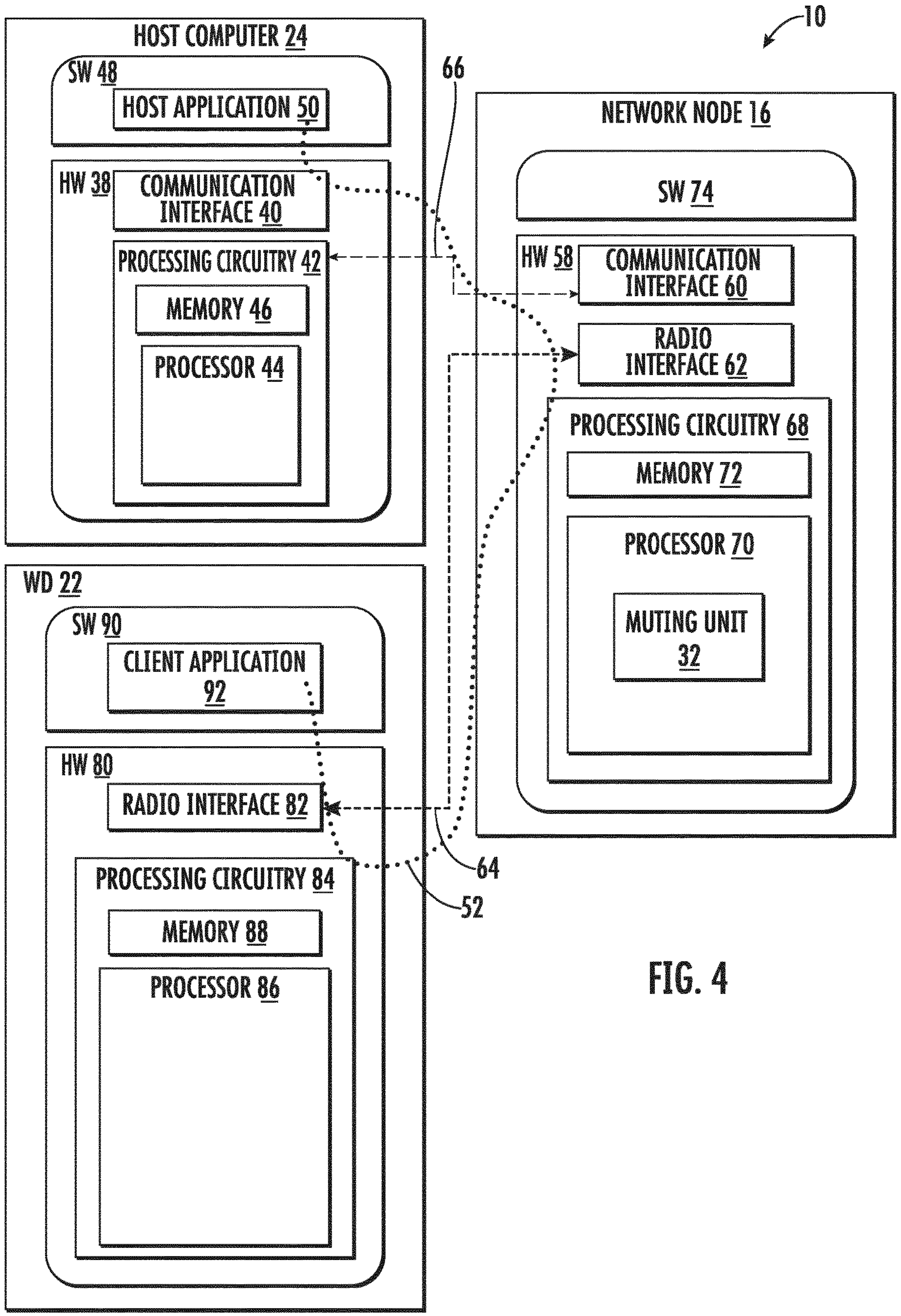
FIG. 4 is a block diagram of a host computer communicating via a network node with a wireless device over an at least partially wireless connection according to some embodiments of the present disclosure.

In FIG. 4, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 3 and 4 show various "units" such as muting unit 32 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 5:
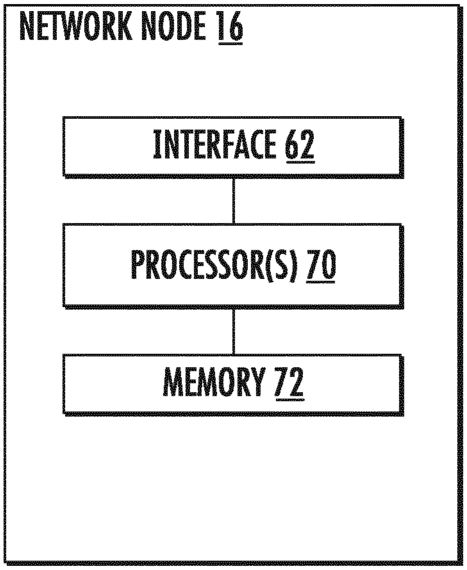
FIG. 5 is a block diagram of a network node configured according to principles set forth herein.

FIG. 5 illustrates one embodiment of a network node 16, which implements the method of selectively muting a downlink and/or uplink transmission described earlier. The network node, 16, comprises an interface 62, one or more processors 70, and a memory, 72. The memory, 72, contains instructions executable by at least one of the processors 70, such that the network node, 16, is operative to carry out the operations of one or more of the methods described herein.

The network node, 16, may include processing circuitry (which may include one or more processors 70), coupled to one or more interfaces 62 and to the memory 72. By way of example, the interface(s) 62, the processor(s) 70, and the memory 72 may be connected in series as illustrated in FIG. 5. Alternatively, these components may be coupled to an internal bus system of the network node, 16.

Figure 6:
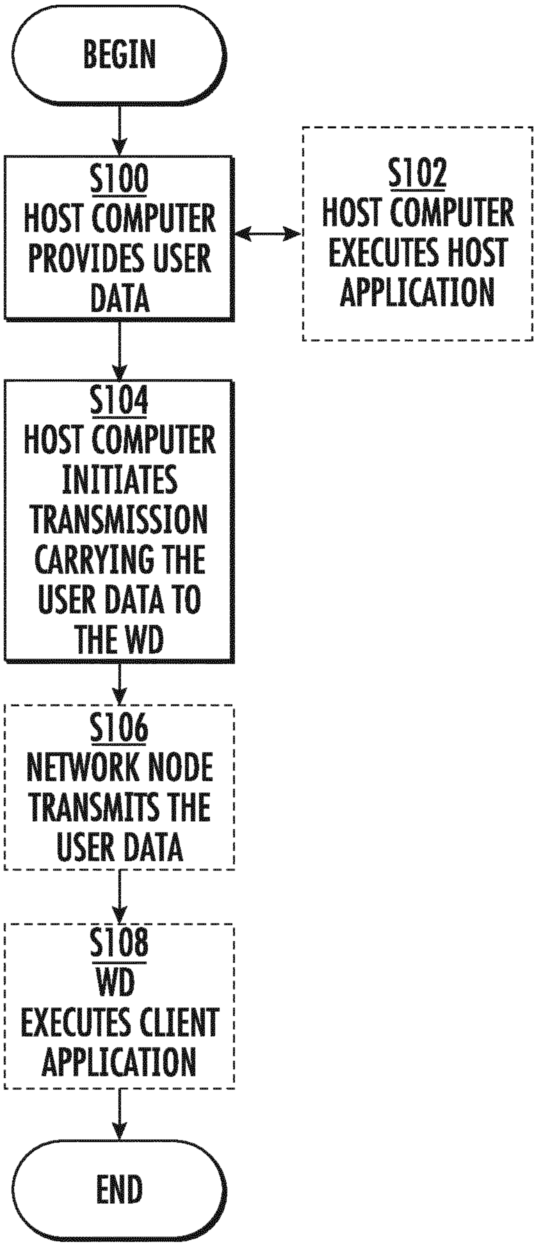
FIG. 6 is a flowchart illustrating exemplary methods implemented in a communication system including a host computer, a network node and a wireless device for executing a client application at a wireless device according to some embodiments of the present disclosure.

FIG. 6 is a flowchart illustrating an exemplary method implemented in a communication system, such as, for example, the communication system of FIGS. 3 and 4, in accordance with one embodiment. The communication system may include a host computer 24, a network node 16 and a WD 22, which may be those described with reference to FIG. 4. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

Figure 7:
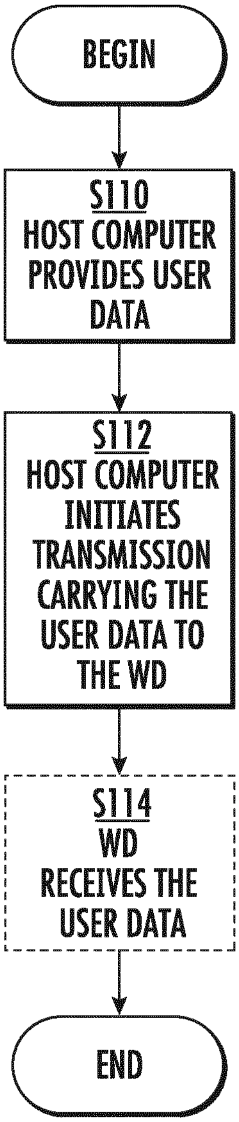
FIG. 7 is a flowchart illustrating exemplary methods implemented in a communication system including a host computer, a network node and a wireless device for receiving user data at a wireless device according to some embodiments of the present disclosure.

FIG. 7 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figure 8:
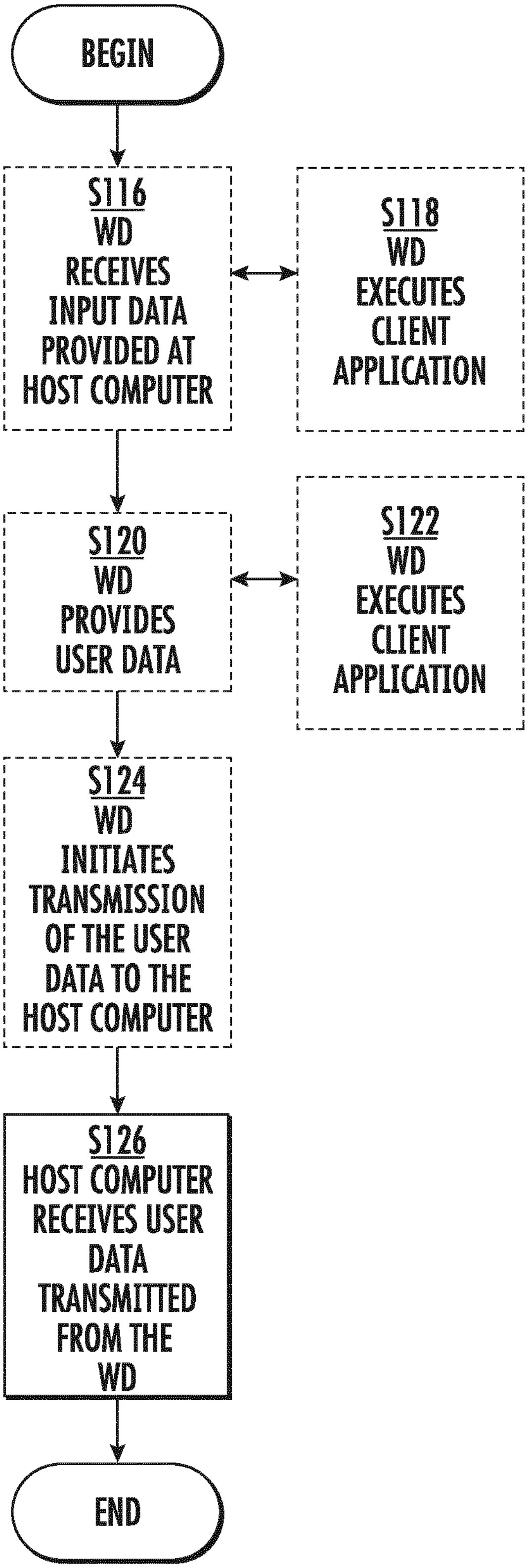
FIG. 8 is a flowchart illustrating exemplary methods implemented in a communication system including a host computer, a network node and a wireless device for receiving user data from the wireless device at a host computer according to some embodiments of the present disclosure.

FIG. 8 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

Figure 9:
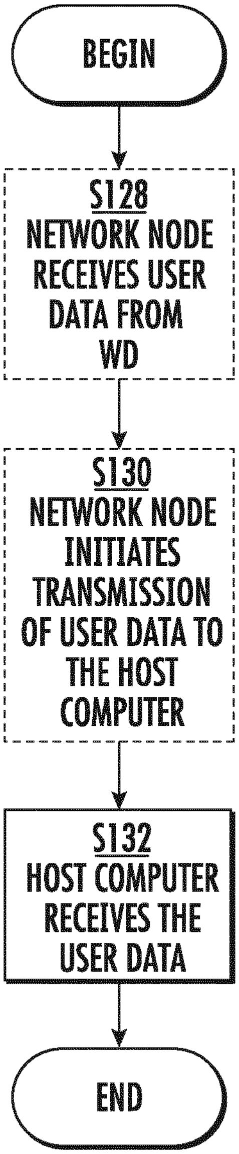
FIG. 9 is a flowchart illustrating exemplary methods implemented in a communication system including a host computer, a network node and a wireless device for receiving user data at a host computer according to some embodiments of the present disclosure.

FIG. 9 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 10:
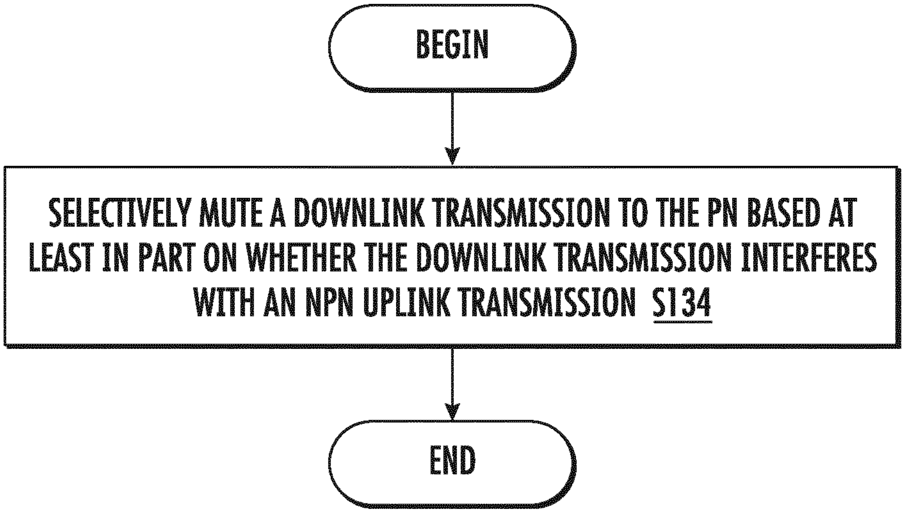
FIG. 10 is a flowchart of an exemplary process in a network node for achieving coexistence of a public network and a non-public network.

FIG. 10 is a flowchart of an exemplary process in a network node 16 for coexistence of a public network and a non-public network. One or more blocks described herein may be performed by one or more elements of network node 16 such as by one or more of processing circuitry 68 (including the muting unit 32), processor 70, radio interface 62 and/or communication interface 60. Network node 16, such as via processing circuitry 68 and/or processor 70 and/or radio interface 62 and/or communication interface 60, is configured to selectively mute a downlink transmission to the PN based at least in part on whether the downlink transmission interferes with an NPN uplink transmission (Block S134).

Figure 11:
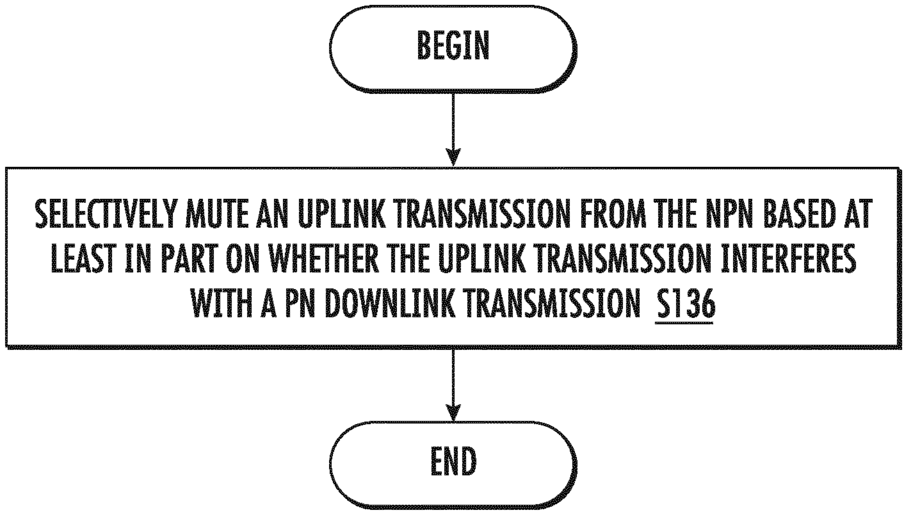
FIG. 11 is a flowchart of an alternative exemplary process in a network node for mitigating interference by selectively muting an uplink transmission.

FIG. 11 is a flowchart of an exemplary process in a network node 16 for mitigation of interference in a public network integrated—non-public network (PNI-NPN). In this embodiment, network node 16 such as by one or more of processing circuitry 68 (including the muting unit 32), processor 70, radio interface 62 and/or communication interface 60 is configured to selectively mute NPN and/or PN downlink and/or uplink transmissions (Block S136).

Figure 12:
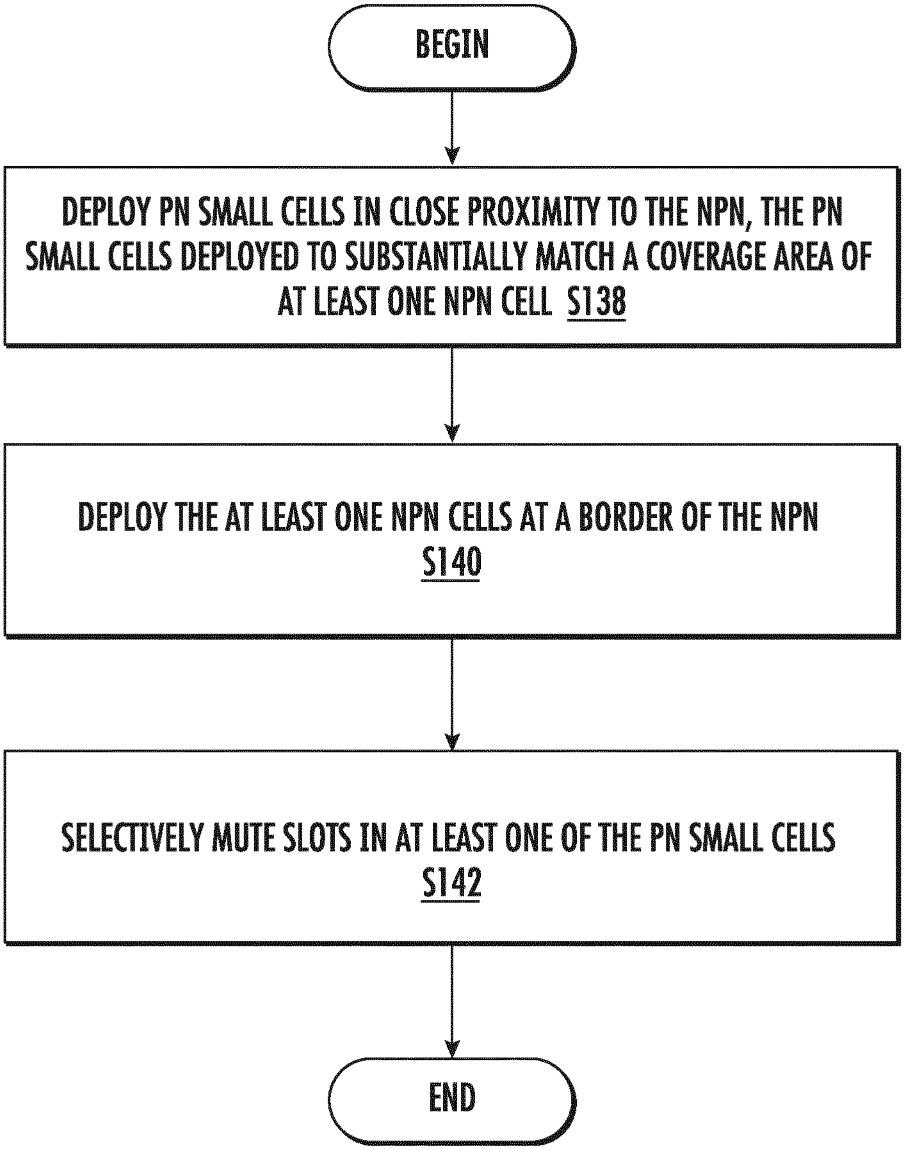
FIG. 12 is a flowchart of an exemplary process for achieving coexistence of a public network and a non-public network.

FIG. 12 is a flowchart of another process for mitigating interference between a PN and an NPN according to some embodiments of the present disclosure. In one or more embodiments, the process may be performed by one or more elements of network node 16 such as by one or more of processing circuitry 68 (including the muting unit 32), processor 70, radio interface 62 and/or communication interface 60. The process includes deploying PN small cells in close proximity to the NPN, the PN small cells being deployed to substantially match the coverage area of at least one NPN cell (Block S138), and/or deploying the at least one NPN cell at a border of the NPN (Block S140). The process further includes selectively muting slots in at least one of the PN small cells (Block S142).

Figure 13:
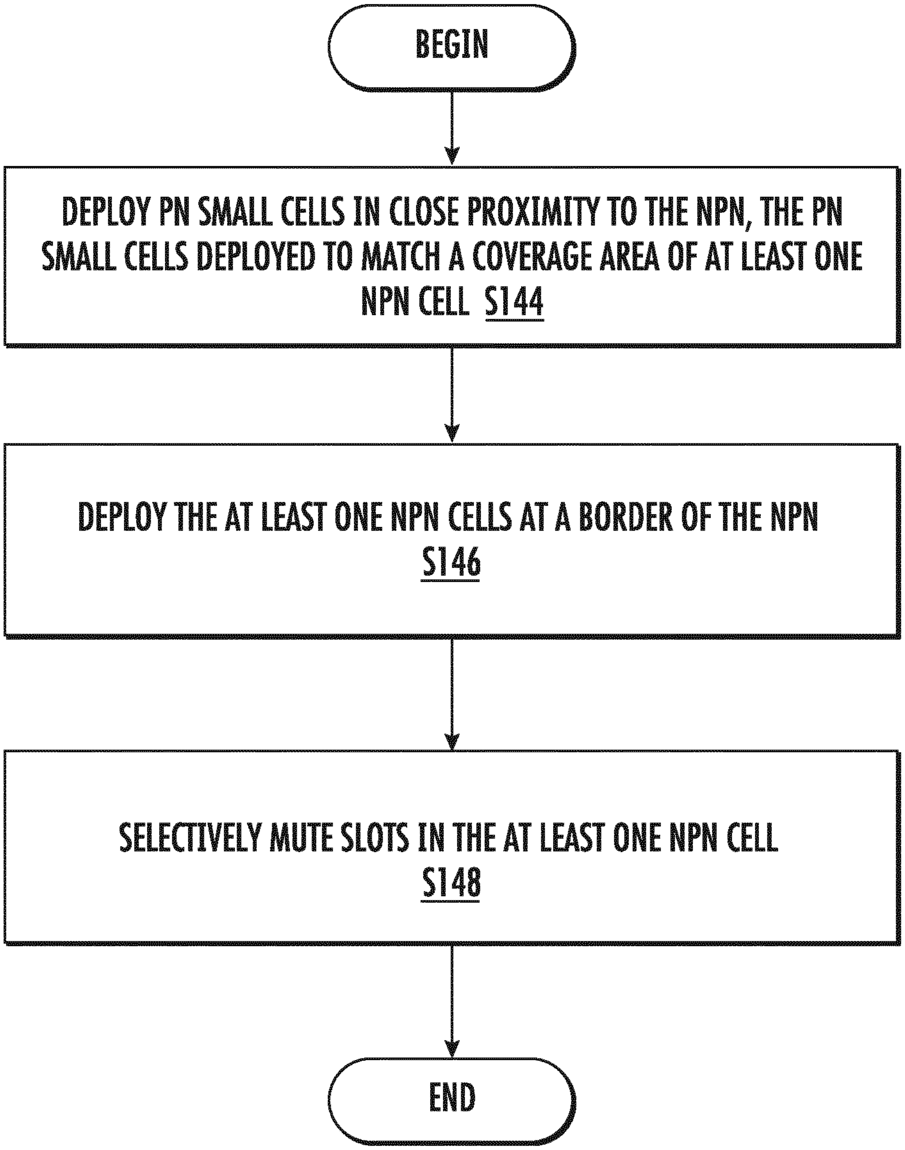
FIG. 13 is a flowchart of an alternative exemplary process for achieving coexistence of a public network and a non-public network.

FIG. 13 is a flowchart of another process for mitigating interference between a PN and an NPN according to some embodiments of the present disclosure. In one or more embodiments, the process may be performed by one or more elements of network node 16 such as by one or more of processing circuitry 68 (including the muting unit 32), processor 70, radio interface 62 and/or communication interface 60. The process includes deploying PN small cells in close proximity to the NPN, the PN small cells being deployed to match coverage area of at least one NPN cell (Block S144), and/or deploying the at least one NPN cell at a border of the NPN (Block S146). The process further includes selectively muting slots in the at least one NPN cell (Block S148).

Figure 14:
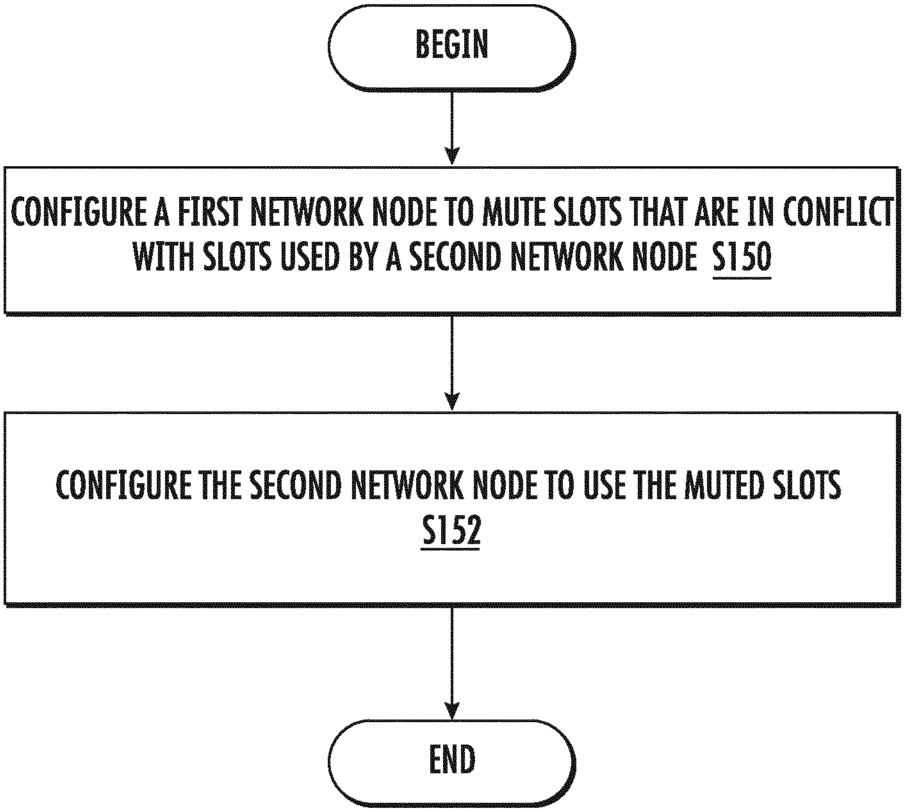
FIG. 14 is a flowchart of yet another exemplary process according to methods set forth herein.

FIG. 14 is a flowchart of another process for mitigating interference between PN and NPN according to some embodiments of the present disclosure. In one or more embodiments, the process may be performed by one or more elements of network node 16 such as by one or more of processing circuitry 68 (including the muting unit 32), processor 70, radio interface 62 and/or communication interface 60. The process includes configuring a first network node to mute slots that are in conflict with slots used by a second network node (Block S10) and configuring the second network node to use the muted slots (Block S152).

Figure 15:
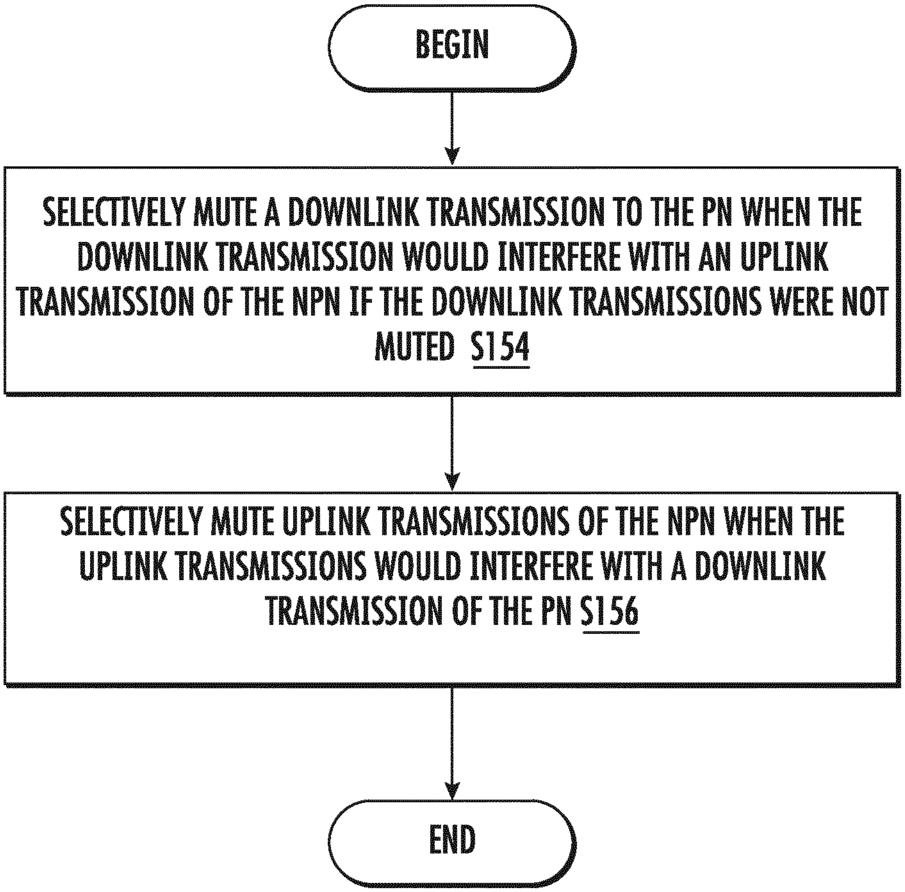
FIG. 15 is a flowchart of an example process for use in a public network, PN, configured to be operable in a presence of a non-public network, NPN, according to principles set forth herein.

FIG. 15 is a flowchart of an example process for use in a PN configured to be operable in a presence of an NPN. One or more blocks described herein may be performed by one or more elements of network node 16 such as by one or more of processing circuitry 68 (including the muting unit 32), processor 70, radio interface 62 and/or communication interface 60. Network node 16, such as via processing circuitry 68 and/or processor 70 and/or radio interface 62 and/or communication interface 60, is configured to perform at least one of: selectively muting downlink transmissions to the PN when the downlink transmissions would interfere with an uplink transmission of the NPN if the downlink transmissions were not muted (Block S154); and selectively muting uplink transmissions of the NPN when the uplink transmissions would interfere with a downlink transmission of the PN (Block S156).

Figure 16:
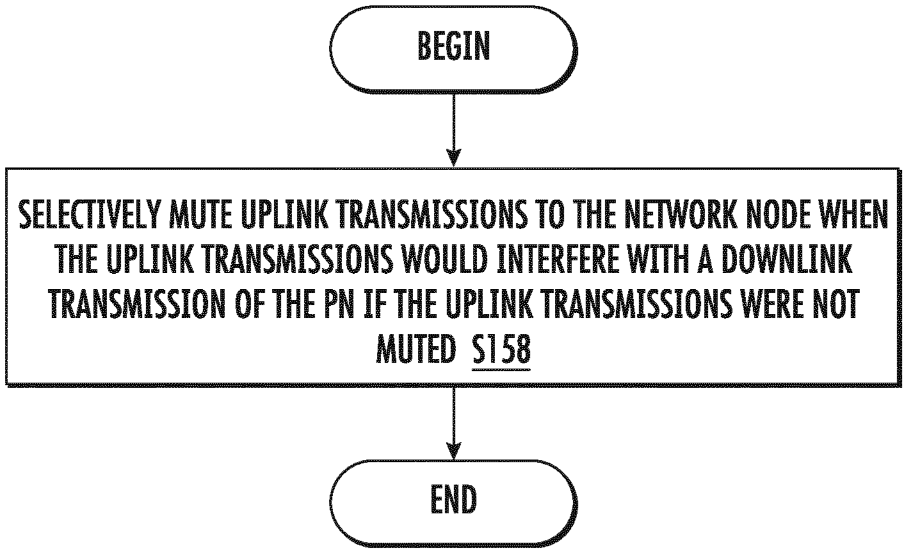
FIG. 16 is a flowchart of an example process for use in a non-public network, NPN, configured to be operable in a presence of a public network, PN, according to principles set forth herein.

FIG. 16 is a flowchart of an example process for use in an NPN configured to be operable in a presence of a PN. One or more blocks described herein may be performed by one or more elements of network node 16 such as by one or more of processing circuitry 68 (including the muting unit 32), processor 70, radio interface 62 and/or communication interface 60. Network node 16, such as via processing circuitry 68 and/or processor 70 and/or radio interface 62 and/or communication interface 60, is configured to mute uplink transmissions to the network node when the uplink transmissions would interfere with a downlink transmission of the PN if the uplink transmissions were not muted (Block S158).

Having described the general process flow of arrangements of the disclosure and having provided examples of hardware and software arrangements for implementing the processes and functions of the disclosure, the sections below provide details and examples of arrangements for coexistence of a public network and a non-public network.

To help improve the coexistence between a Macro Public Network (PN) and the Non-Public Network (NPN) operating in the same shared band or in adjacent bands, a method of muting the PN DL slots that are in conflict with the NPN UL slots is provided.

Figure 17:
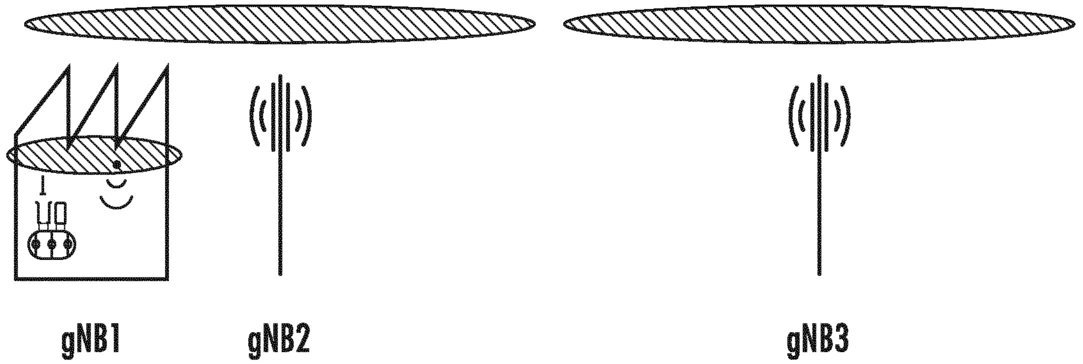
FIG. 17 is a diagram of example coverage by a public network and a non-public network.

FIG. 17 illustrates a deployment scenario where a PN network, served by gNB1 (i.e., network node 16) and gNB2, has overlapping coverage with the NPN deployed in a factory, served by gNB1.

In some embodiments, it may be assumed that the PN and NPN networks are time synchronized and are using the same sub-carrier spacing (SCS), but they are using different TDD configurations (different UL-DL pattern).

Figure 18:
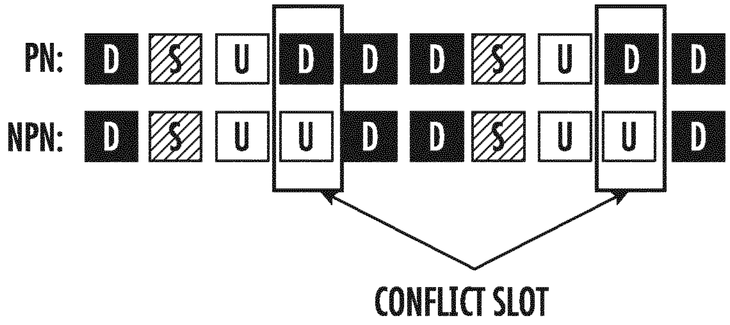
FIG. 18 is an example of muting of slots according to principles set forth below.

For example, when the PN is using TDD configuration 2 (3:1) that is favorable for MBB deployments scenarios, while the NPN is using a TDD configuration 1 (1:1) that is favorable to URLLC deployments, there may be slots/subframes that are in conflict, as depicted in FIG. 18.

Figure 19:
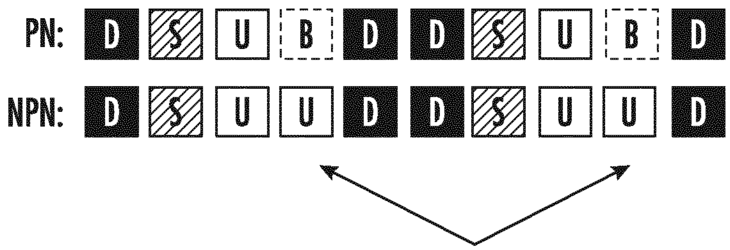
FIG. 19 is another example of muting of slots according to principles set forth below.

Embodiment 1: Mute PN DL Slots/Sub-Frames that are in Conflict with NPN UL Slots/Sub-Frames In some embodiments, the network node 16 of the PN such as by one or more of processing circuitry 68 (including the muting unit 32), processor 70, radio interface 62 and/or communication interface 60 determines the cells/sectors that are overlapping with the NPN deployment, and mutes the slot that is in conflict for those particular cells and/or sectors, as illustrated, for example, in FIG. 19. The network node 16 may 16 such as by one or more of processing circuitry 68 (including the muting unit 32), processor 70, radio interface 62 and/or communication interface 60 infer cells/sectors that are overlapping with the NPN deployment by WDs 22 reporting that they are within the coverage area of the closed subscriber group of the NPN. Moreover, WDs 22 served by the network node 16 may such as via radio interface 82 report poor channel quality indicators (CQI) due to strong adjacent channel interference (ACI) from the NPN UL transmissions that collide with the PN DL slots. The PN network may suffer a 33% DL performance degradation for those cells, but the coexistence with the NPN is improved, and the NPN may be able to fulfil the low-latency requirements. Note that the determining of overlap may be performed by a network element other than the network node 16. Or one or more different network elements may provide information to the network node 16 from which the overlap may be determined by network node 16. Thus, in some embodiments, the only PN downlink resources on cells that are muted by the network node 16 are those that may potentially interfere with the NPN network.

Embodiment 2: Mute NPN UL Slots/Sub-Frames that are in Conflict with PN DL Slots/Sub-Frames Some embodiments include muting the UL slots/sub-frames of the NPN that are in conflict with the DL slots/sub-frames of the PN. This muting may be instead of or contemporaneous with the muting of PN DL slots/sub-frames as described above for Embodiment 1. In some embodiments, the NPN may also, or in the alternative, mute DL slots/sub-frames while the PN mutes UL slots/sub-frames.

Embodiment 3: In a PNI-NPN Network

Figure 20:
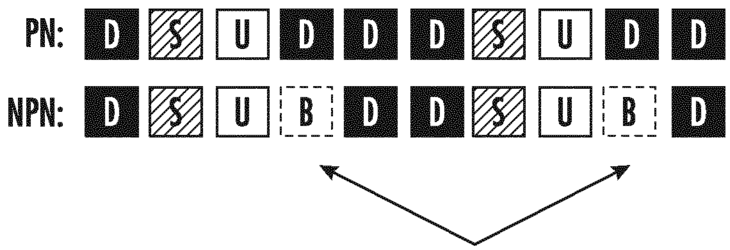
FIG. 20 is yet another example of muting of slots according to principles set forth below.

In some embodiments, if the NPN network is a PNI-NPN, then the PN operator may be aware of the PN cells that are overlapping with NPN cells. For example, FIG. 20 illustrates that the PN cell served, for example, by a network node 16 such as a gNB, overlaps with the NPN cell served by the network node 16, e.g., gNB, and can configure slot muting for the impacted PN cells.

In case of a PNI-NPN, the slot muting of the network node 16 of the PN could also be part of the network node 16 scheduler, providing increased flexibility as to when muting is used or not.

In cases where the NPN is an SNPN, there may be a collaboration between the PN and NPN operators to determine the PN cells where the slot muting may be required.

In cases of SNPN and separate network deployments, the muting of PN slots by the network node 16 may be configurable.

Embodiment 4: Coexistence of an NR NPN with LTE

In another embodiment, the networks deployed may need to be coordinated with existing 3GPP LTE services, either due to the legacy network or service capabilities. In such a scenario, a 5G TDD configuration that facilitates co-existence with LTE Configuration 2 is depicted in FIG. 20.

Figure 21:
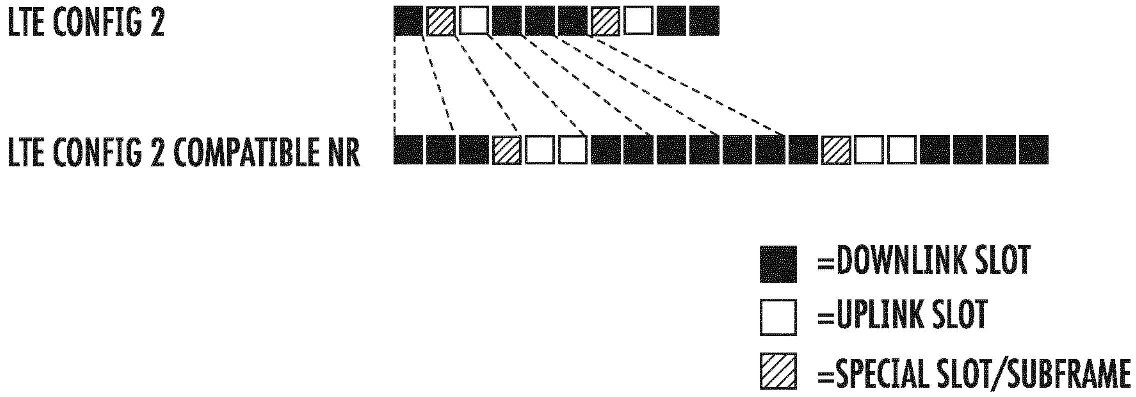
FIG. 21 is yet another example of muting of slots according to principles set forth below.
Figure 22:
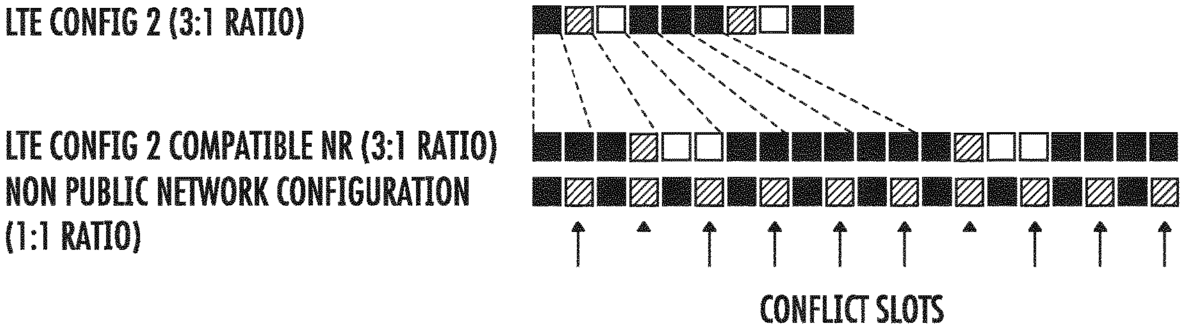
FIG. 22 is yet another example of muting of slots according to principles set forth below.

In such a scenario, the public network nodes 16 may be configured according to the configuration of FIG. 20 and/or FIG. 21 where FIG. 21 illustrates a NR PN co-existence with NR URLLC NPN, and an NPN network may need to co-exist with these configurations. For example, FIG. 22 depicts an example NR configuration compatible with the LTE configuration 2 for the PN, as well as a the URLLC (1:1 Ratio) configuration in NR for the NPN. In order to protect the URLLC service of the NPN, conflicting slots that would be subject to muting are shaded in FIG. 22. The special slots in the NPN may be used with mostly UL symbols, so that all special slots potentially conflict with the PN. Hence, the slots to be blanked may be selected based on the network to protect.

Embodiment 5: Restrict the Slot/Sub-Frame Muting Only to PN Beams that are Interfering or Overlapping with NPN Cells If the network node 16 of the PN network employs an active antenna system (AAS), muting the DL slot may be restricted only to beams that potentially interfere or that are subject to interference with the NPN network. A feature of this embodiment is that when a macro PN network node 16 employs an advanced antenna system (AAS), the selected beams of the macro PN network node 16 are unlikely to point towards the NPN coverage area; hence reducing mutual interference between NPN and macro PN.

Embodiment 6: Deploy PN Small Cells that Match the Coverage of the NPN Network and Selectively Mute Slots in a PN Small Cell In this embodiment, small cells of the PN network are placed in close physical vicinity to the NPN. These PN small cells may be placed such they match or substantially match (or overlap) a coverage area of the NPN. The small cells may be configured to serve the PN WDs 22 that are potential victims to the uplink transmissions of the NPN WDs 22. By selectively muting the downlink slot of the PN small cells, interference scenarios (3) and (4) in FIG. 2 are avoided. At the same time, restrictions due to blocked transmission opportunities by muting, via the network node 16, may be substantially reduced to WDs 22 within the coverage area of the NPN. This allows the macro cells of the PN to operate without any restrictions on slot muting.

Embodiment 7: Through Muting of Selected Slots in the NPN Network, e.g., if the NPN is Deployed Outdoors, the PN Service can be Protected from Interference This embodiments allows the Macro Public Network (PN) node 16 to use the same band at an adjacent frequency as the Non-Public Network (NPN), while allowing the NPN to use a different TDD Configuration (i.e., different UL-DL pattern) that may allow those NPN network nodes deployed indoors to meet strict latency requirements of URLLC. Note that NPN network nodes deployed indoors may have the outer walls to insulate from PN to NPN interference. Hence, indoor deployments may be more robust towards DL interference from the PN towards the NPN. With such an embodiment, basic services may be possible for outdoor NPN deployments, while URLLC would be enabled for indoor NPN deployments.

Embodiment 8: Deploy Border NPN Cells to Limit NPN Performance Impact Due to UL Slots/Sub-Fame Muting At selected locations near the border of the NPN network, some small cells of the NPN network may be deployed. By muting the uplink slots that may collide with downlink slots of the PN, UL to DL interference from NPN to PN, as well as DL to UL interference from PN to NPN is further reduced.

According to one aspect, a network node 16 for use in a public network, PN, configured to be operable in a presence of a non-public network, NPN, is provided. The network node 16 includes processing circuitry 68 configured to perform at least one of the following: selectively muting downlink transmissions to the PN when the downlink transmissions would interfere with an uplink transmission of the NPN if the downlink transmissions were not muted; and selectively muting uplink transmissions of the NPN when the uplink transmissions would interfere with a downlink transmission of the PN.

According to this aspect, in some embodiments, selective muting is during time slots when the downlink transmission would interfere with an uplink transmission. In some embodiments, the downlink muting is restricted to beams of the downlink transmissions that would interfere with the uplink transmission of the NPN. In some embodiments, the downlink muting is restricted to downlink transmissions to wireless devices, WDs, 22 in communication with the PN that are within a coverage area of the NPN. In some embodiments, the network node 16 is positioned within the coverage area of the NPN. In some embodiments, the processing circuitry 68 is further configured to determine coverage areas of the network node 16 that overlap a coverage area of the NPN and to restrict the muting to the overlapping coverage areas. In some embodiments, determining coverage areas of the network node 16 that overlap a coverage area of the NPN is based at least in part on reporting by wireless devices, WDs, within the coverage area of the NPN. In some embodiments, the selective muting is based at least in part on detected interference between the PN and the NPN. In some embodiments, the selective muting is based at least in part on whether the PN uses a time division duplex, TDD, configuration that is different than a TDD configuration of the NPN.

According to another aspect, a method in a network node 16 for use in a public network, PN, configured to be operable in a presence of a non-public network, NPN, is provided. The method includes performing at least one of the following: selectively muting downlink transmissions to the PN when the downlink transmissions would interfere with an uplink transmission of the NPN if the downlink transmissions were not muted; and selectively muting uplink transmissions of the NPN when the uplink transmissions would interfere with a downlink transmission of the PN.

According to this aspect, in some embodiments, selective muting is during time slots when the downlink transmission would interfere with an uplink transmission. In some embodiments, downlink muting is restricted to beams of the downlink transmissions that would interfere with the uplink transmission of the NPN. In some embodiments, the downlink muting is restricted to downlink transmissions to wireless devices, WDs, in communication with the PN that are within a coverage area of the NPN. In some embodiments, the method further includes determining coverage areas of the network node 16 that overlap a coverage area of the NPN and restricting the muting to the overlapping coverage areas. In some embodiments, determining coverage areas of the network node 16 that overlap a coverage area of the NPN is based at least in part on reporting by wireless devices, WDs, within the coverage area of the NPN. In some embodiments, the selective muting is based at least in part on detected interference between the PN and the NPN. In some embodiments, the selective muting is based at least in part on whether the PN uses a time division duplex, TDD, configuration that is different than a TDD configuration of the NPN.

According to yet another aspect, a network node 16 for use in a non-public network, NPN, configured to be operable in a presence of a public network, PN, is provided. The network node 16 includes processing circuitry 68 configured to selectively mute uplink transmissions to the network node 16 when the uplink transmissions would interfere with a downlink transmission of the PN if the uplink transmissions were not muted.

According to this aspect, in some embodiments, the selective muting is during time slots when the uplink transmission would interfere with a downlink transmission. In some embodiments, the processing circuitry 68 is further configured to mute downlink transmissions while the PN is muting uplink transmissions. In some embodiments, the network node 16 is placed at a border of the NPN.

According to another aspect, a method in a network node 16 for use in a non-public network, NPN, configured to be operable in a presence of a public network, PN, is provided. The method includes selectively muting uplink transmissions to the NPN when the uplink transmissions would interfere with a downlink transmission of the PN if the uplink transmissions were not muted.

According to this aspect, in some embodiments, the method further includes muting downlink transmissions while the PN is muting uplink transmissions. In some embodiments, the network node 16 is placed at a border of the NPN.

According to yet another aspect, a method for mitigating interference between a public network (PN) and a non-public network (NPN), is provided. The method includes deploying PN small cells in close proximity to the NPN, the PN small cells deployed to match a coverage area of at least one NPN cell. The method includes deploying the at least one NPN cell at a border of the NPN, and selectively muting transmissions in at least one of the PN small cells.

According to this aspect, in some embodiments, the muting is of downlink transmissions when the NPN has stricter latency requirements than the PN. In some embodiments, the method also includes selectively muting uplink transmissions when downlink traffic of the PN is greater than the downlink traffic of the NPN.

According to one aspect, a network node 16 of a public network (PN), the network node 16 configured to communicate with a wireless device (WD 22) served by a non-public network (NPN) is provided. The network node 16 includes processing circuitry 68 configured to selectively mute a downlink transmission to the PN based at least in part on whether the downlink transmission interferes with an NPN uplink transmission.

According to this aspect, in some embodiments, the selectively muting, via the processing circuitry 68, is based at least in part on whether interference between the PN and the NPN is detected. In some embodiments, the selective muting is based at least in part on whether a beam transmitted by the network node 16 interferes with or is interfered with by a transmission of the NPN. In some embodiments, this interference may otherwise occur only in certain slots of the transmitted beam. In some embodiments, the selective muting is based at least in part on whether the NPN uses a time division duplex (TDD) configuration that is different than a TDD configuration used by the PN. In some embodiments, the selective muting is on a per cell basis in the PN.

According to another aspect, a method includes selectively muting, via the muting unit 32 of the processing circuitry 68, a downlink transmission to the NPN based at least in part on whether the downlink transmission interferes with an NPN uplink transmission.

According to this aspect, in some embodiments, the selective muting is based at least in part on whether interference between the PN and the NPN is detected. In some embodiments, the selective muting is based at least in part on whether a beam of the network node 16 interferes with or is interfered with by a transmission of the NPN. In some embodiments, the selective muting is based at least in part on whether the NPN uses a time division duplex (TDD) configuration that is different than a TDD configuration used by the PN. In some embodiments, this interference may otherwise occur only in certain slots of the transmitted beam.

According to yet another aspect, a method includes deploying PN small cells in close proximity to the NPN, the PN small cells deployed to substantially match a coverage area of at least one NPN cell, deploying the at least one NPN cell at a border of the NPN and selectively muting slots in at least one of the PN small cells. In some embodiments, the selective muting includes muting uplink slots and downlink slots.

According to another aspect, a method for mitigating interference between a public network (PN) and a non-public network (NPN) is provided. The method includes deploying PN small cells in close proximity to the NPN, the PN small cells deployed to match a coverage area of at least one NPN cell. The method further includes deploying the at least one NPN cell at a border of the NPN. The method also includes selectively muting slots in the at least one NPN cell. In some embodiments, the selective muting includes muting uplink slots and downlink slots.

According to another aspect, a first network node 16 is configured to mitigate adjacent channel interference. The first network node 16 is configured to mute slots that are in conflict with slots used by a second network node 16 configured to use the muted slots. In some embodiments, the first network node 16 is selected based at least in part on having lower latency requirements than the second network node 16.

According to another aspect, a method for mitigating adjacent channel interference between two network deployments that use different time division duplex (TDD) configurations is provided. The includes configuring a first network node 16 to mute slots that are in conflict with slots used by a second network node 16, and configuring the second network node 16 to use the muted slots. In some embodiments, the first network node 16 is in a first network having lower latency requirements than a second network that includes the second network node 16.

According to yet another aspect, a network node 16 of a non-public network (NPN) is provided. The network node 16 includes a radio interface 62 and/or processing circuitry 68 configured to selectively mute an uplink transmission from the NPN based at least in part on whether the uplink transmission interferes with a PN downlink transmission. In some embodiments, the network node 16 is in a public network integrated-non-public network (PNI-NPN). In some embodiments, the network node 16 is in a standalone non public network (SNPN).

According to another aspect, a method implemented in a network node 16 of a non-public network (NPN) is provided. The method includes selectively muting an uplink transmission from the NPN based at least in part on whether the uplink transmission interferes with a PN downlink transmission. In some embodiments, the network node 16 is in a public network integrated-non-public network (PNI-NPN). In some embodiments, the network node 16 is in a standalone nonpublic network (SNPN).

Some embodiments include the following:

Embodiment A1. A network node of a public network (PN), the network node including a radio interface and/or processing circuitry configured to:

selectively mute a downlink transmission to the PN based at least in part on whether the downlink transmission interferes with a non-public network (NPN) uplink transmission.

Embodiment A2. The network node of Embodiment A1, wherein the selective muting is based at least in part on whether interference between the PN and the NPN is detected.

Embodiment A3. The network node of Embodiment A1, wherein the selective muting is based at least in part on whether a beam transmitted by the network node interferes with or is interfered with by a transmission of the NPN.

Embodiment A4. The network node of Embodiment A1, wherein the selective muting is based at least in part on whether the NPN uses a time division duplex (TDD) configuration that is different than a TDD configuration used by the PN.

Embodiment A5. The network node of Embodiment A4, wherein the selective muting is on a per cell basis in the PN.

Embodiment B1. A method implemented in a network node, the method comprising:

selectively muting a downlink transmission to a public network (PN) based at least in part on whether the downlink transmission interferes with a non-public network (NPN) uplink transmission.

Embodiment B2. The method of Embodiment B1, wherein the selective muting is based at least in part on whether interference between the PN and the NPN is detected.

Embodiment B3. The method of Embodiment B1, wherein the selective muting is based at least in part on whether a beam of the network node interferes with or is interfered with by a transmission of the NPN.

Embodiment B4. The method of Embodiment B1, wherein the selective muting is based at least in part on whether the NPN uses a time division duplex (TDD) configuration that is different than a TDD configuration used by the PN.

Embodiment B5. The method of Embodiment B4, wherein the selective muting is on a per cell basis in the PN.

Embodiment C1. A method for mitigating interference between a public network (PN) and a non-public network (NPN), the method comprising:

deploying PN small cells in close proximity to the NPN, the PN small cells deployed to match a coverage area of at least one NPN cell;

deploying the at least one NPN cell at a border of the NPN; and selectively muting slots in at least one of the PN small cells.

C2. The method of C1, wherein the selective muting includes muting uplink slots and downlink slots.

Embodiment D1. A method for mitigating interference between a public network (PN) and a non-public network (NPN), the method comprising:

deploying PN small cells in close proximity to the NPN, the PN small cells deployed to match a coverage area of at least one NPN cell;

deploying the at least one NPN cell at a border of the NPN; and selectively muting slots in the at least one NPN cell.

D2. The method of D1, wherein the selective muting includes muting uplink slots and downlink slots.

Embodiment E1. A first network node configured to mitigate adjacent channel interference, the first network node configured to:

mute slots that are in conflict with slots used by a second network node configured to use the muted slots.

Embodiment E2. The first network node of Embodiment E1, wherein the first network node is selected based at least in part on having lower latency requirements than the second network node.

Embodiment F1. A method for mitigating adjacent channel interference between two network deployments that use different time division duplex (TDD) configurations, the method comprising:

configuring a first network node to mute slots that are in conflict with slots used by a second network node; and configuring the second network node to use the muted slots.

Embodiment F2. The method of Embodiment F1, wherein the first network node is in a first network having lower latency requirements than a second network that includes the second network node.

Embodiment G1. A network node of a non-public network (NPN), the network node including a radio interface and/or processing circuitry configured to:

selectively mute an uplink transmission from the NPN based at least in part on whether the uplink transmission interferes with a PN downlink transmission.

Embodiment G2 The network node of Embodiment G1, wherein the network node is in a public network integrated-non-public network (PNI-NPN).

Embodiment G3. The network node of Embodiment G1, wherein the network node is in a standalone non-public network (SNPN).

Embodiment H1. A method implemented in a network node of a non-public network (NPN), the method comprising:

selectively muting an uplink transmission from the NPN based at least in part on whether the uplink transmission interferes with a PN downlink transmission.

Embodiment H2 The method of Embodiment H1, wherein the network node is in a public network integrated-non-public network (PNI-NPN).

Embodiment H3. The method of Embodiment H1, wherein the network node is in a standalone nonpublic network (SNPN).

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
|---|---|
| DL | Downlink |
| E2E | end-to-end |
| NR | New Radio |
| NID | Network Identity |
| NPN | Non-Public Network |
| PLMN-ID | Public Land Mobile Network Identity |
| PN | Public Network |
| PNI-NPN | Public Network-Integrated NPN |
| SNPN | Stand-alone Non-Public Network |
| SCS | Sub-Carrier Spacing |
| TDD | Time-Division Duplex |
| UL | Uplink |
| UE | User Equipment |
| URLLC | Ultra-Reliable Low Latency Communication |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

The invention claimed is:

1. A network node for use in a public network, PN, configured to be operable in a presence of a non-public network, NPN, the network node comprising processing circuitry configured to perform at least one of the following:

selectively muting downlink transmissions to the PN when the downlink transmissions would interfere with an uplink transmission of the NPN if the downlink transmissions were not muted;

selectively muting uplink transmissions of the NPN when the uplink transmissions would interfere with a downlink transmission of the PN; and the selective muting of downlink transmissions by the PN being based at least in part on whether a latency requirement of the NPN is more stringent than a latency requirement of the PN, and the selective muting of uplink transmissions by the NPN being based at least in part on a latency requirement of the NPN and whether a downlink traffic demand of the PN exceeds a threshold.

2. The network node of claim 1, wherein selective muting is during time slots when the downlink transmission would interfere with an uplink transmission.

3. The network node of claim 1, wherein the downlink muting is restricted to beams of the downlink transmissions that would interfere with the uplink transmission of the NPN.

4. The network node of claim 1, wherein the downlink muting is restricted to downlink transmissions to wireless devices, WDs, in communication with the PN that are within a coverage area of the NPN.

5. The network node of claim 1, wherein the network node is positioned within the coverage area of the NPN.

6. The network node of claim 1, wherein the processing circuitry is further configured to determine coverage areas of the network node that overlap a coverage area of the NPN and to restrict the muting to the overlapping coverage areas.

7. The network node of claim 6, wherein determining coverage areas of the network node that overlap a coverage area of the NPN is based at least in part on reporting by wireless devices, WDs, within the coverage area of the NPN.

8. The network node of claim 1, wherein the selective muting is based at least in part on detected interference between the PN and the NPN.

9. A method in a network node for use in a public network, PN, configured to be operable in a presence of a non-public network, NPN, the method comprising performing at least one of the following:

selectively muting downlink transmissions to the PN when the downlink transmissions would interfere with an uplink transmission of the NPN if the downlink transmissions were not muted;

selectively muting uplink transmissions of the NPN when the uplink transmissions would interfere with a downlink transmission of the PN; and the selective muting of downlink transmissions and the selective muting of uplink transmissions by the NPN being based at least in part on a latency requirement of the NPN and whether a downlink traffic demand of the PN exceeds a threshold.

10. The method of claim 9, wherein selective muting is during time slots when the downlink transmission would interfere with an uplink transmission.

11. The method of claim 9, wherein downlink muting is restricted to beams of the downlink transmissions that would interfere with the uplink transmission of the NPN.

12. The method of claim 9, wherein the downlink muting is restricted to downlink transmissions to wireless devices, WDs, in communication with the PN that are within a coverage area of the NPN.

13. The method of claim 12, further comprising determining coverage areas of the network node that overlap a coverage area of the NPN and restricting the muting to the overlapping coverage areas.

14. The method of claim 13, wherein determining coverage areas of the network node that overlap a coverage area of the NPN is based at least in part on reporting by wireless devices, WDs, within the coverage area of the NPN.

15. A network node for use in a non-public network, NPN, configured to be operable in a presence of a public network, PN, the network node comprising processing circuitry configured to:

selectively mute uplink transmissions to the network node when the uplink transmissions would interfere with a downlink transmission of the PN if the uplink transmissions were not muted, the selective muting of uplink transmissions by the NPN based at least in part on a latency requirement of the NPN and whether a downlink traffic demand of the PN exceeds a threshold.

16. The network node of claim 15, wherein the processing circuitry is further configured to mute downlink transmissions while the PN is muting uplink transmissions.

17. A method in a network node for use in a non-public network, NPN, configured to be operable in a presence of a public network, PN, the method comprising:

selectively muting uplink transmissions to the NPN when the uplink transmissions would interfere with a downlink transmission of the PN if the uplink transmissions were not muted, the selective muting of uplink transmissions by the NPN based at least in part on a latency requirement of the NPN and whether a downlink traffic demand of the PN exceeds a threshold.

18. The method of claim 17, further comprising muting downlink transmissions while the PN is muting uplink transmissions.

* * * * *